March 2, 1926.
C. I. WALKER
SAFETY DEVICE FOR BRAKE RODS
Filed Oct. 2, 1923
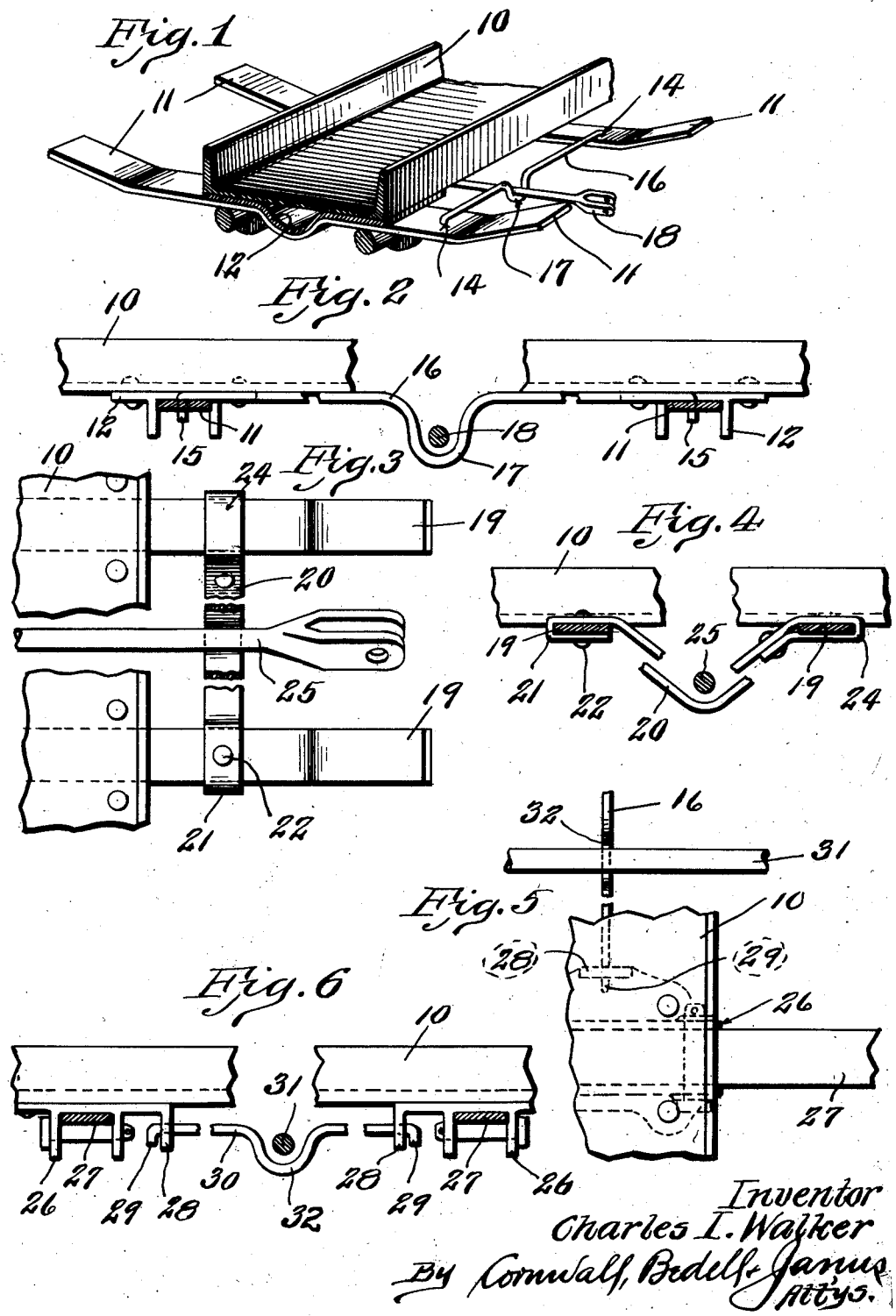
Inventor
Charles I. Walker
By Cornwall, Bedell & Janus
Attys.

March 2, 1926.
C. I. WALKER
SAFETY DEVICE FOR BRAKE RODS
Filed Oct. 2, 1923
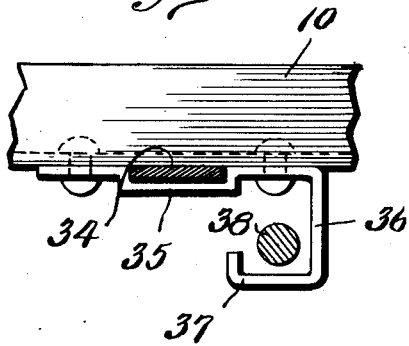
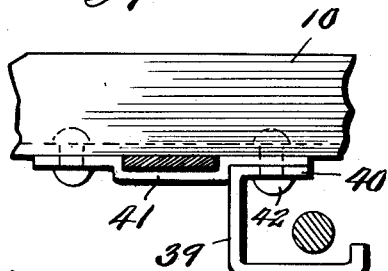
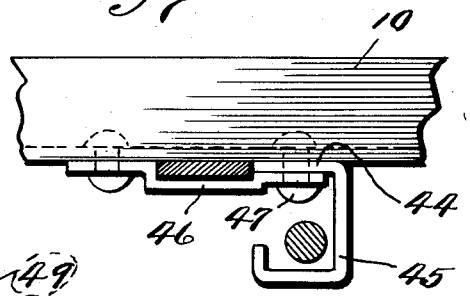
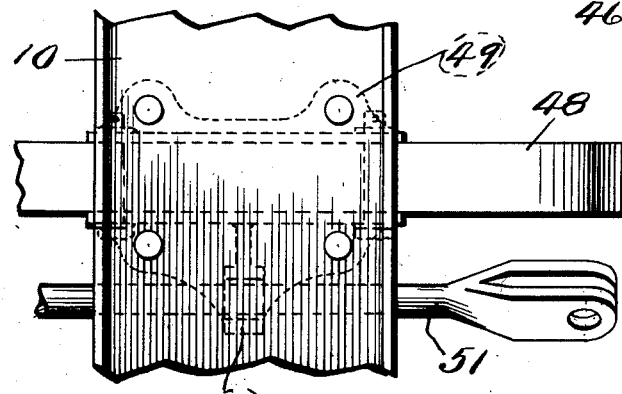
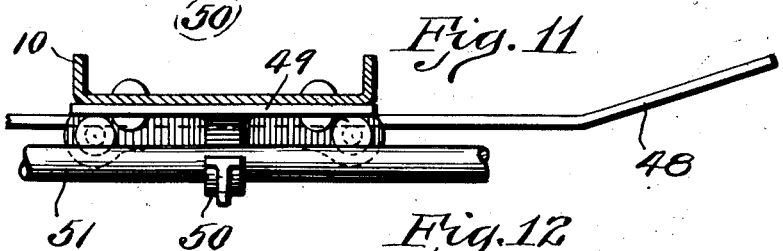
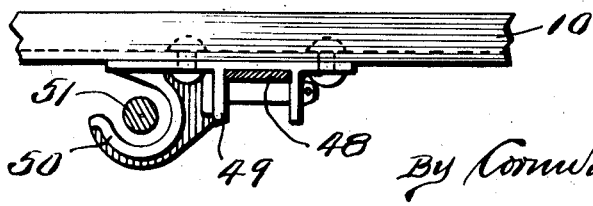

Patented Mar. 2, 1926.

1,575,238

UNITED STATES PATENT OFFICE.

CHARLES I. WALKER, OF LOS ANGELES, CALIFORNIA, ASSIGNOR TO CHICAGO RAILWAY EQUIPMENT COMPANY, OF CHICAGO, ILLINOIS, A CORPORATION OF ILLINOIS.

SAFETY DEVICE FOR BRAKE RODS.

Application filed October 2, 1923. Serial No. 666,192.

*To all whom it may concern:*

Be it known that I, CHARLES I. WALKER, a citizen of the United States, residing at Los Angeles, California, have invented a certain new and useful Improvement in Safety Devices for Brake Rods, of which the following is a specification such as will enable others skilled in the art to which it appertains, to make and use the same.

This invention relates to new and useful improvements in safety devices for brake rods and is particularly adapted for use in connection with bottom rod connections of brake gears.

The objects of the invention are to provide a safety device which may be used in conjunction with third or fourth point supports, thereby simplifying the construction and installation of such safety devices and obviating the necessity of providing separate attaching and supporting means for said safety devices.

Further objects of the invention are to provide a safety device which will engage and support a brake rod in case it becomes accidentally disconnected at its either end from the brake mechanism, thereby successfully preventing the disengaged end from dropping to the ground and causing injury to the brake rigging and possibly derailment of the car.

Still further objects of the invention are to provide a safety device for brake rods which is of simple construction and inexpensive to manufacture, can be easily installed without affecting the brake gear and which is adapted to be supported by third or fourth point supports.

With these and other objects in view, my invention consists in certain novel features of construction and arrangement of parts, hereinafter more fully described and claimed, and illustrated in the accompanying drawings, in which—

Figure 1 is a perspective detail view of a spring plank and the spring supports carried thereby and showing the safety device arranged on said spring supports in cooperative relation with the bottom rod connection.

Figure 2 is an enlarged front elevational view, partly broken away, of the safety device and showing the spring supports and the bottom rod connection in cross section.

Figure 3 is a top plan view, partly broken away, of a modified form of a safety device.

Figure 4 is a front elevational view, partly broken away, of the device shown in Figure 3.

Figure 5 is a top plan view of another modified form and showing the safety member carried by the support bracket.

Figure 6 is a front elevational view of the form shown in Figure 5.

Figure 7 is a detail view of another modified form in which the safety member is formed integral with the support bracket.

Figures 8 and 9 show modified forms wherein the safety members are formed separate from the support bracket.

Figure 10 is a top plan view, partly broken away, of a safety device as applied to a third point support and is formed integral with the support bracket.

Figure 11 is a side elevational view of the form shown in Figure 10.

Figure 12 is a front elevational view with the third point support and the brake bottom rod connection in cross section.

Much damage to brake beams and brake rigging and sometimes derailments of the car are caused by the disengagement of the bottom rod connection from the brake mechanism and the dropping of the disengaged end of the brake rod to the ground. Even in cases where safety devices are used to safeguard the brake beams the disconnected brake rod pulls out some of the brake rigging, thereby causing derailment of the car. The present invention has for its object to safeguard the bottom rod connection so that should the latter become disengaged it will be caught by the safety device and held against displacement thus eliminating all danger of injury to the brake gear and to the car.

Referring by numerals to the accompanying drawings and particularly to Figures 1 and 2, 10 indicates a spring plank to which are secured spring supports 11 by suitable support brackets 12. Spring supports 11 which are designed as fourth point supports are provided near one of their ends with apertures 14 in which are seated downwardly bent ends 15 of a safety bar 16. This bar is provided at a suitable point with a depression or seat 17 which extends below and partially embraces bottom brake rod connection 18 which latter constitutes an operating element of the brake mechanism. The depression 17 is preferably of sufficient dimensions to provide clearance therebetween and brake rod 18 so that said depression does not interfere with the operating movements of said brake rod. If, for any reason, one end of the brake rod becomes disengaged from its operative connections, for instance, when the lever pin works itself loose, the brake rod instead of dropping to the ground and consequently injuring the brake rigging is caught by the depression 17 of safety bar 16 and is held against displacement thereby.

In Figures 3 and 4 spring supports 19 are secured to the spring plank in any suitable manner and secured to one of said supports is one end of a strap 20 which end is bent over and under said support and secured in position thereon by a rivet 22. The opposite end of the strap is provided with a loop 24 which engages the other one of said spring supports. Strap 20 passes under a bottom rod connection 25 and serves to engage the latter and hold it against displacement in case either one of its ends becomes disengaged.

In Figures 5 and 6 support brackets 26 which are secured to spring plank 10 and carry spring supports 27 are provided with inwardly spaced and downwardly projecting ears or lugs 28 in which are arranged the ends 29 of a safety bar 30. This safety bar is provided where it intersects bottom connection 31 with a seat or depression 32 which normally provides sufficient clearance for said rod and is adapted in case of accidental disengagement thereof to receive the same and prevent its dropping to the ground.

In Figure 7 spring support 34 is supported by a bracket 35 and formed integral with said bracket is a safety member 36, the lower end of which is provided with a hook 37 which extends under and partially embraces bottom connection 38.

In Figure 8 a safety member 39 is provided at its upper end with a horizontally disposed portion 40 which fits against the shouldered portion of support bracket 41 and is secured in position by a rivet 42 which also secures one side of support bracket 41 to the spring plank.

In Figure 9 the horizontally disposed portion 44 of the upper end of safety member 45 is disposed between the spring plank 10 and supports bracket 46 and is secured with the latter to spring plank 10 by a rivet 47.

In Figures 10 to 12 inclusive which show a third point support 48 carried by a support bracket 49 the safety member 50 is formed integral with said bracket and extends laterally therefrom so as to partially embrace brake rod 51. The safety member 50 is preferably in the form of a hook and may be forged on said bracket or attached to it in any suitable manner.

I claim:

1. In a car truck construction, the combination with a brake beam support, of means secured to said support and adapted to catch and support a brake rod when the latter is disconnected at either one of its ends.

2. In a car truck construction, the combination with a third or fourth point support, of a member carried by said support and adapted to engage and support a brake rod in case of an accidental displacement thereof.

3. In a car truck construction, the combination with a pair of spaced supporting members fixed to a part of a truck, of a member having its ends carried by said supporting members and underlying a part of a brake gear for engaging and supporting the same in case of accidental displacement thereof.

4. In a brake gear construction, a safety device for brake rods comprising in combination with a car truck part and a pair of spaced supporting members carried thereby of an element anchored at its ends to said members and adapted to extend under a brake rod for forming an emergency support therefor.

5. A safety device for brake rods comprising a pair of spaced members adapted to be carried by a car truck part and a member extending between said spaced members and adapted to underlie a brake rod and support the same in case of displacement thereof.

6. In a car truck construction, the combination with fourth point supports, of a member extending between said supports and having its ends secured thereto, said member extending below a brake rod for engaging and supporting the latter in case of accidental disengagement thereof.

7. In a car truck construction, the combination with fourth point supports, of a member arranged therebetween and having its ends engaging said supports and provided with a portion extending under a brake rod and adapted to engage and support the same when said rod becomes accidentally disengaged from its operative connections.

In testimony whereof I hereunto affix my signature this 17 day of Sep., 1923.

CHARLES I. WALKER.